(12) United States Patent
Hogan et al.

(10) Patent No.: US 8,788,723 B1
(45) Date of Patent: Jul. 22, 2014

(54) SYSTEM AND APPARATUS FOR CONTROLLING USE OF MASS STORAGE DEVICES

(76) Inventors: Robert F. Hogan, Portsmouth, NH (US);
Larry R. Stilwell, Fremont, NH (US);
Linda Stilwell, legal representative,
Fremont, NH (US); A. Christian Jackson, Hudson, NH (US)

(*) Notice: Subject to any disclaimer, the term of this patent is extended or adjusted under 35 U.S.C. 154(b) by 238 days.

(21) Appl. No.: 12/156,664

(22) Filed: Jun. 2, 2008

Related U.S. Application Data

(60) Provisional application No. 60/932,860, filed on Jun. 1, 2007.

(51) Int. Cl.
*G06F 3/00* (2006.01)
(52) U.S. Cl.
USPC .................................. 710/18; 726/2; 709/905
(58) Field of Classification Search
None
See application file for complete search history.

(56) References Cited

U.S. PATENT DOCUMENTS

| | | | | |
|---|---|---|---|---|
| 6,233,536 | B1* | 5/2001 | Zale et al. | 702/188 |
| 7,272,606 | B2* | 9/2007 | Borthakur et al. | 707/769 |
| 7,406,563 | B1* | 7/2008 | Nagshain | 711/114 |
| 7,409,563 | B2* | 8/2008 | Howard et al. | 713/194 |
| 7,587,676 | B2* | 9/2009 | Gomez et al. | 715/741 |
| 8,051,204 | B2* | 11/2011 | Kai et al. | 709/242 |
| 2002/0069355 | A1* | 6/2002 | Garrison | 713/153 |
| 2003/0182563 | A1* | 9/2003 | Liu et al. | 713/191 |
| 2004/0006688 | A1* | 1/2004 | Pike et al. | 713/1 |
| 2006/0085584 | A1* | 4/2006 | Chen et al. | 710/303 |
| 2008/0120691 | A1* | 5/2008 | Flewallen et al. | 726/1 |
| 2009/0193524 | A1* | 7/2009 | Shoji et al. | 726/27 |

* cited by examiner

*Primary Examiner* — Elias Mamo
(74) *Attorney, Agent, or Firm* — Lorusso & Associates

(57) ABSTRACT

Disclosed is a software program, USB monitoring software agent. USB monitoring software agent is a software program that monitors all USB ports of a computer and provides real-time detection of all USB devices connected to a USB port. As a USB device is detected, the device is identified, categorized, catalogued and logged in a secure persistent store, prompted for a challenge policy of use if so configured, prevent the USB device from being used if so configured, transmit information about the detected USB device to a local or remote repository by a selected industry standard telecommunication method.

14 Claims, 22 Drawing Sheets

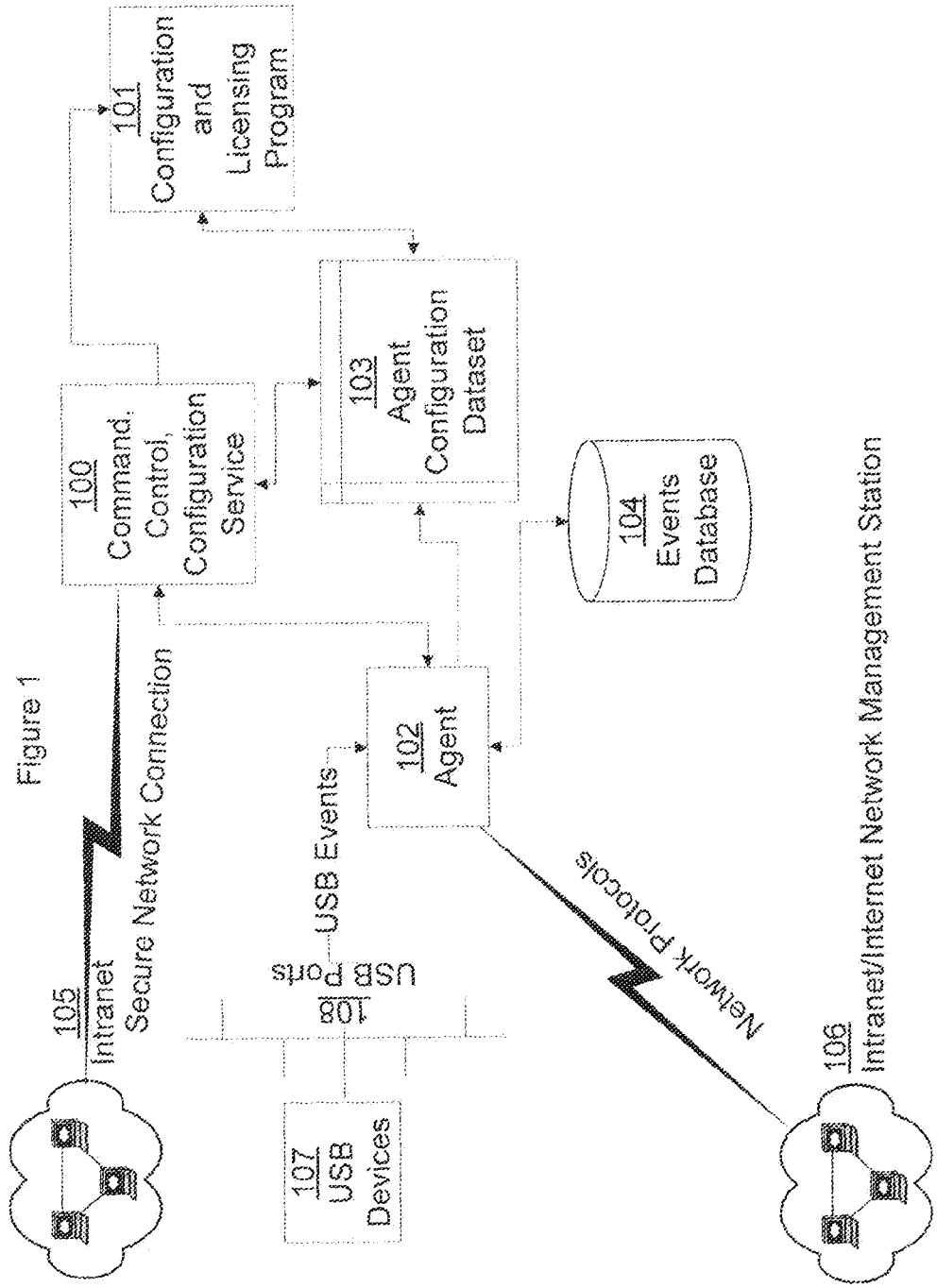

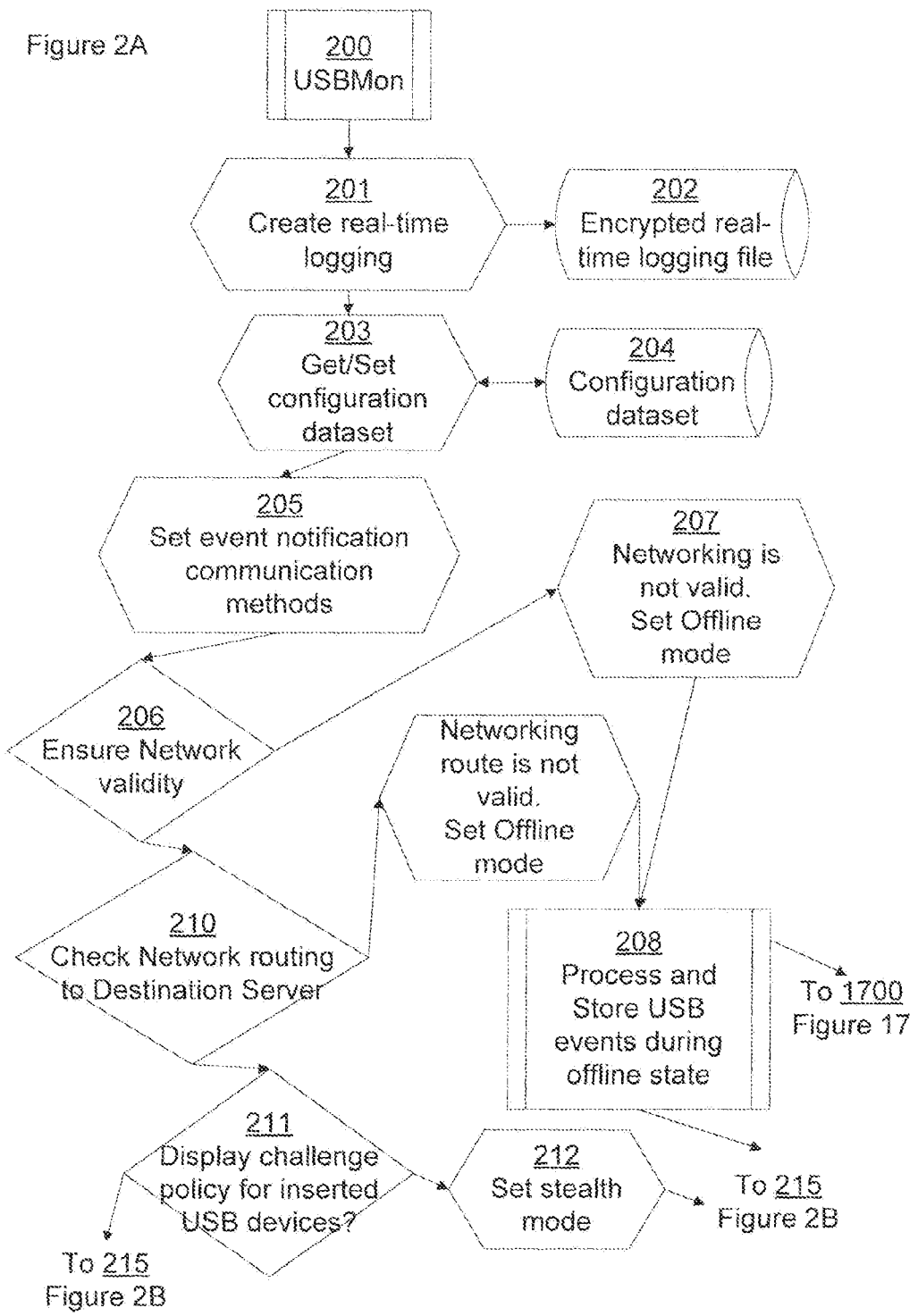

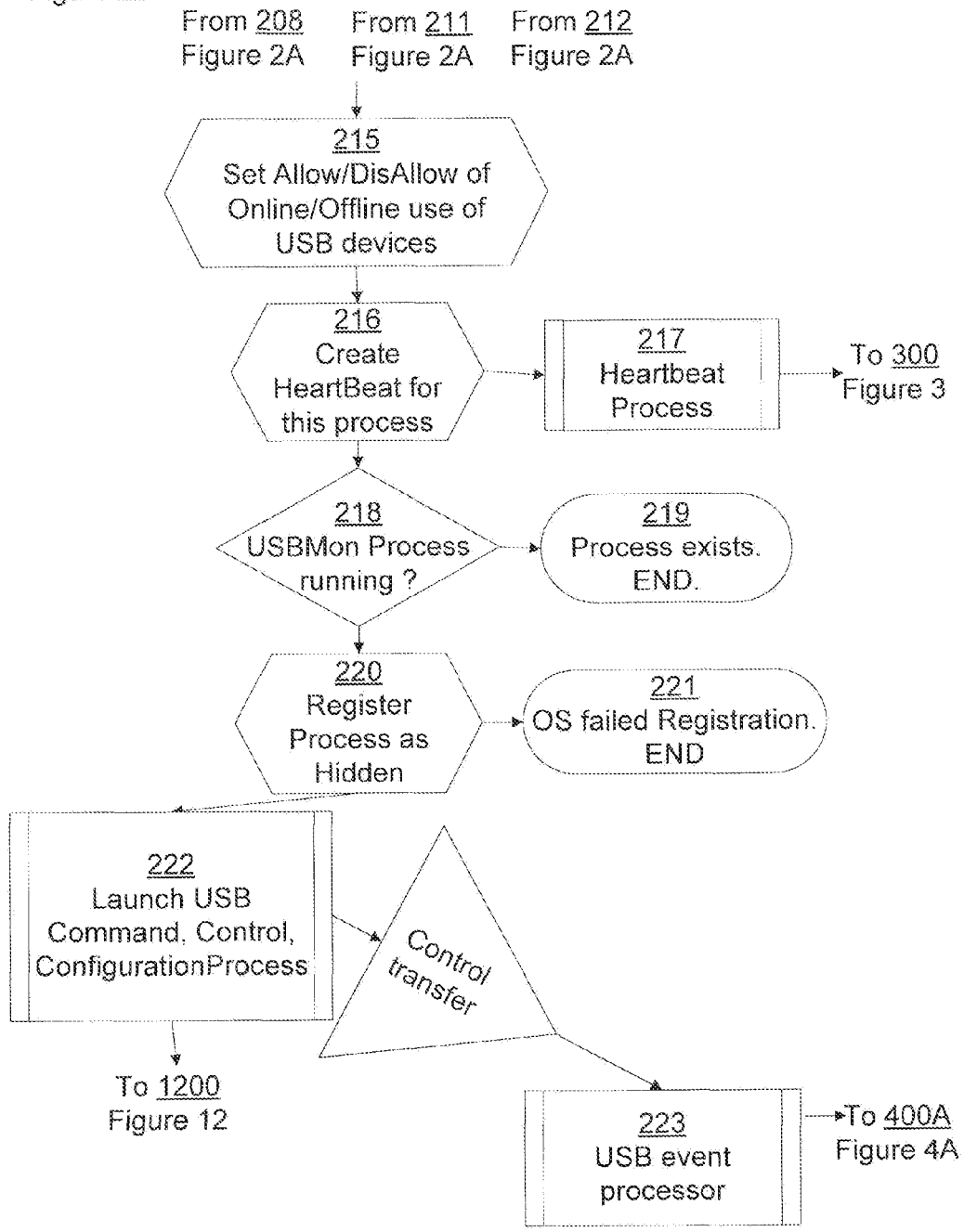

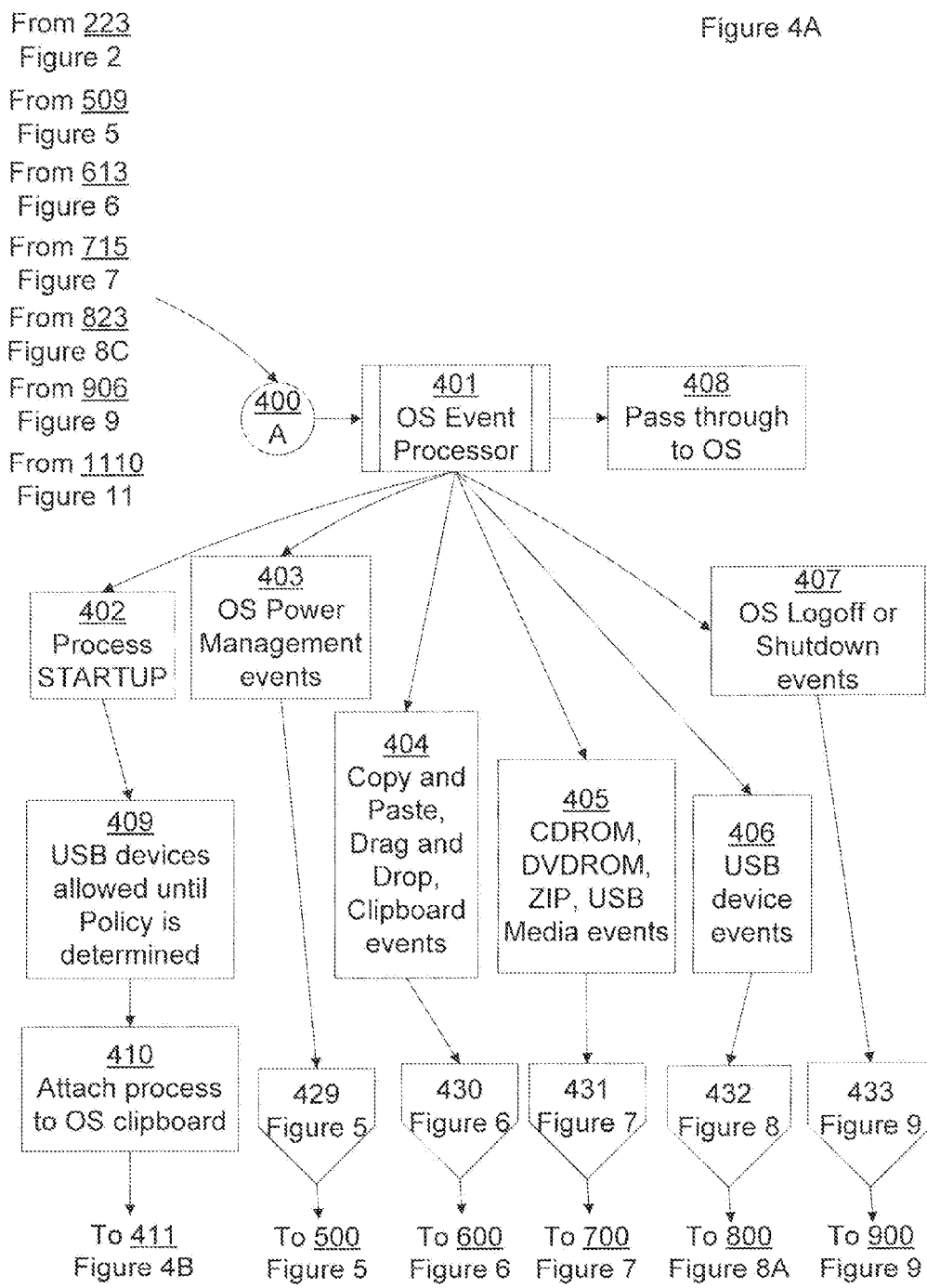

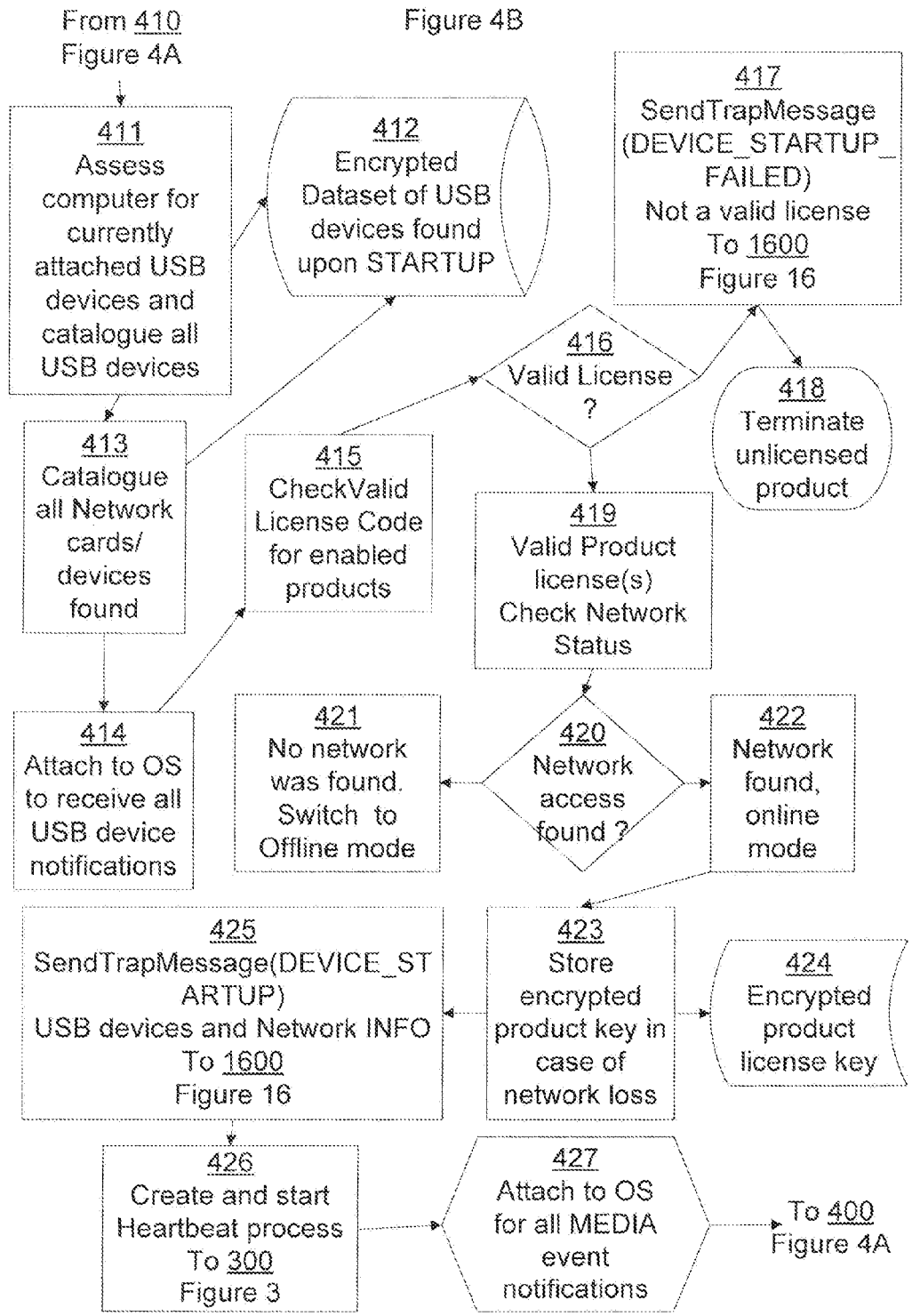

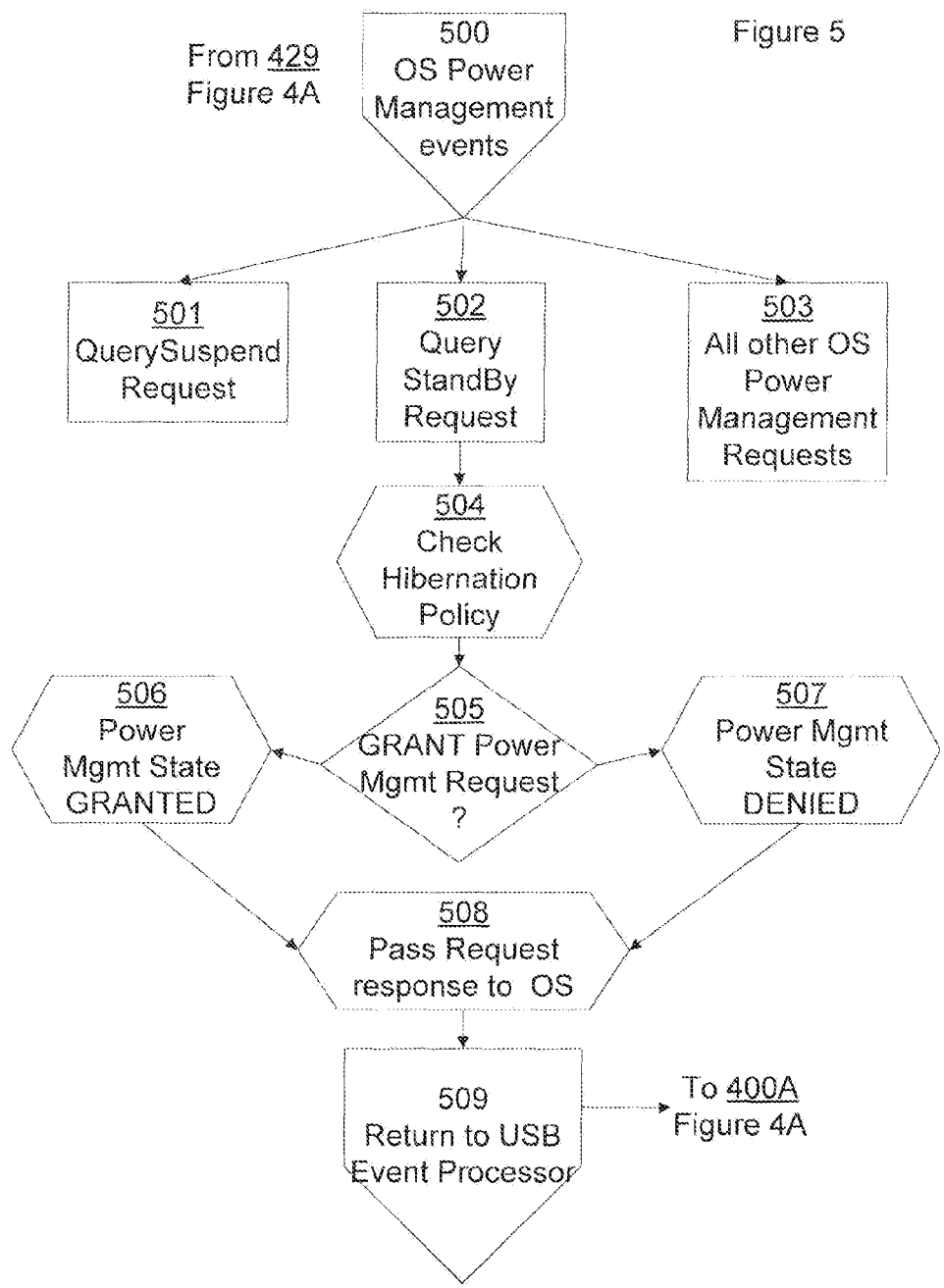

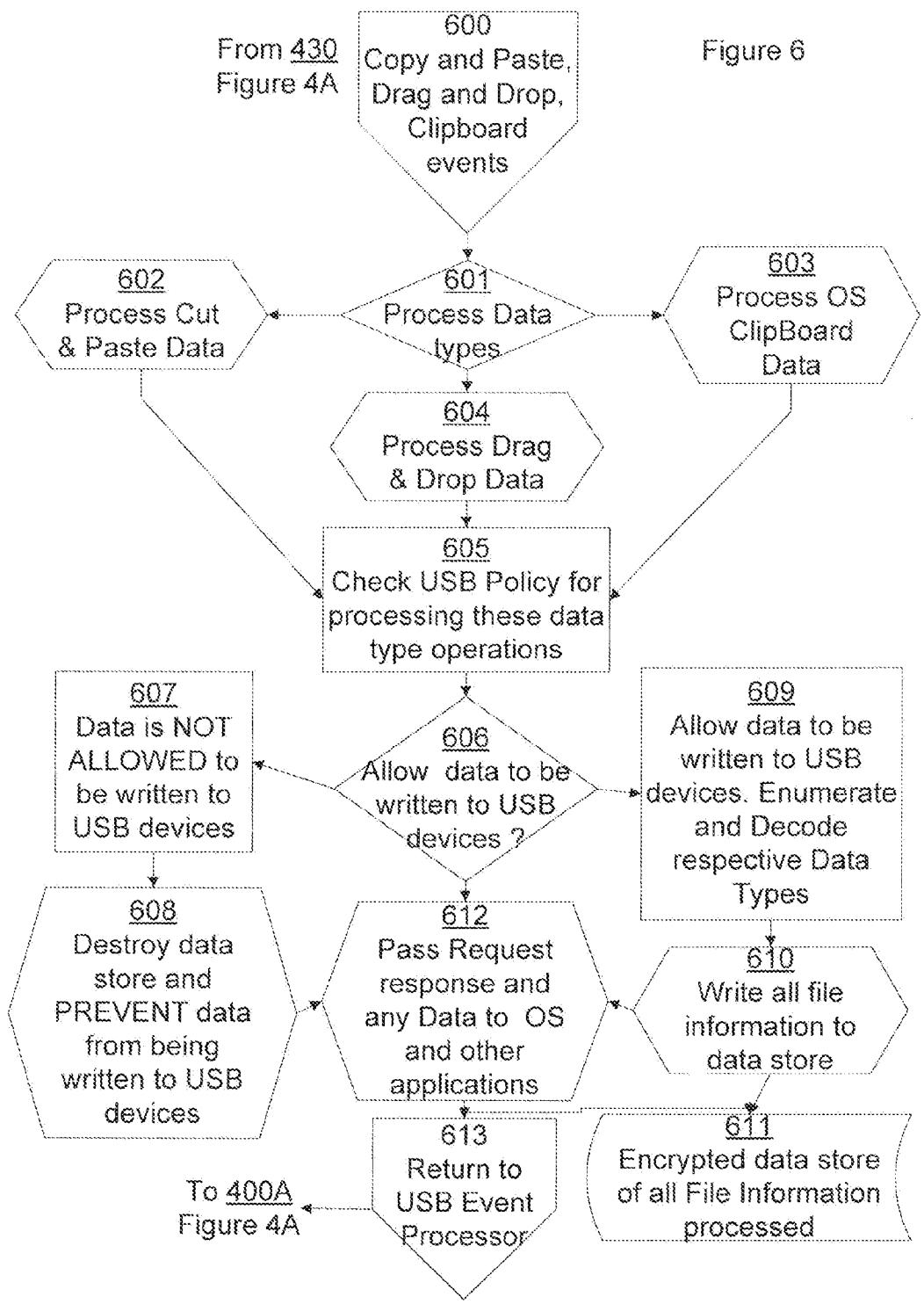

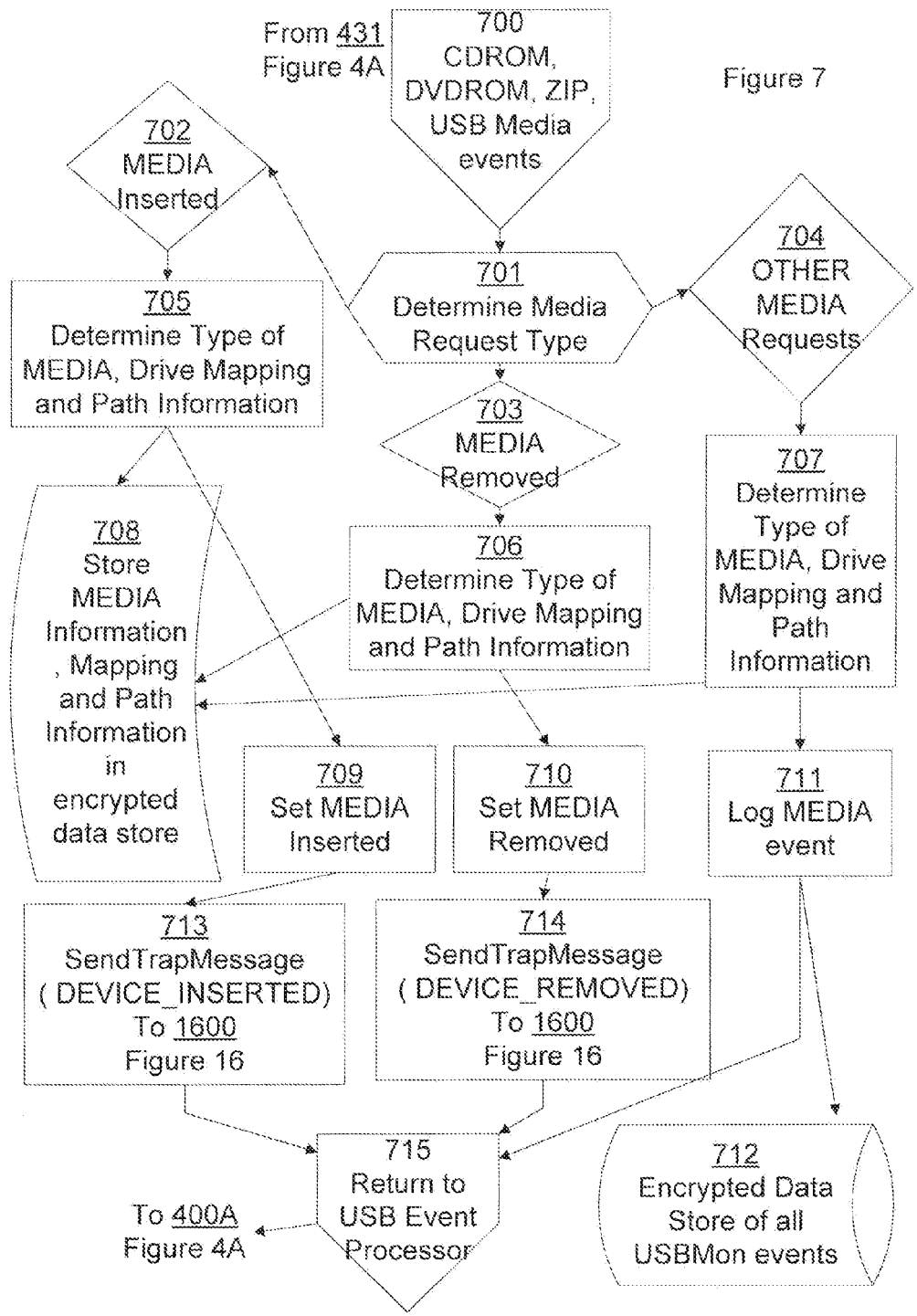

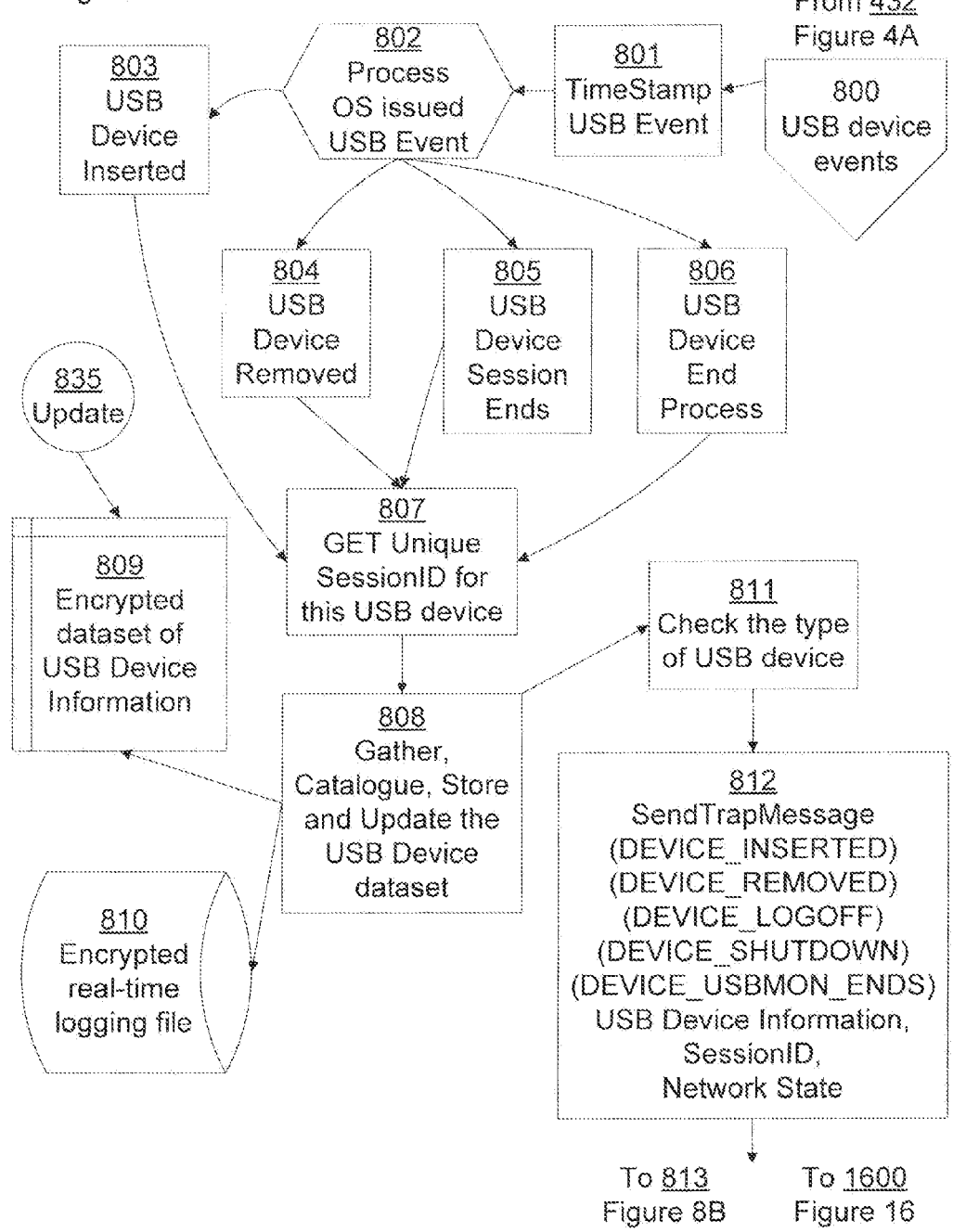

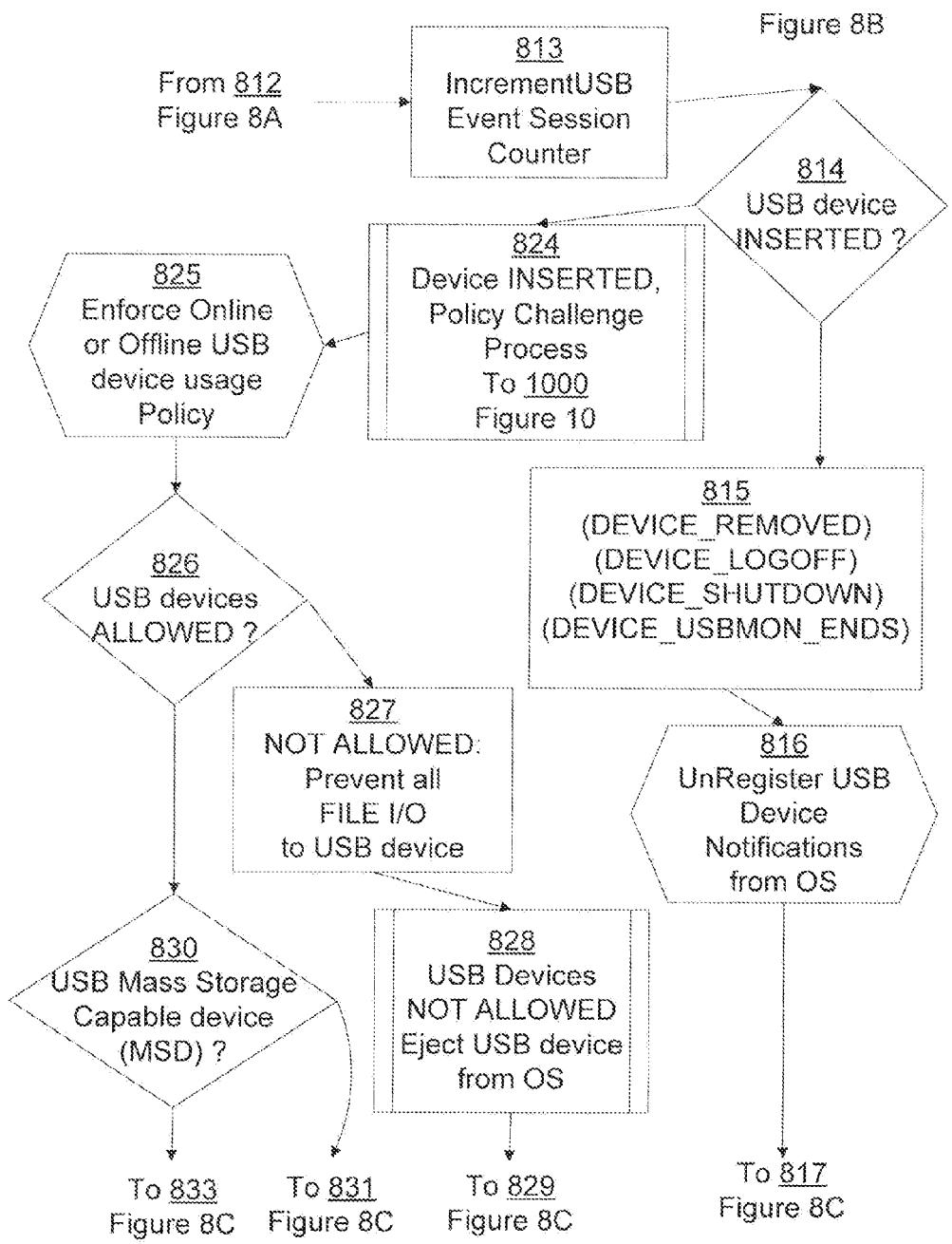

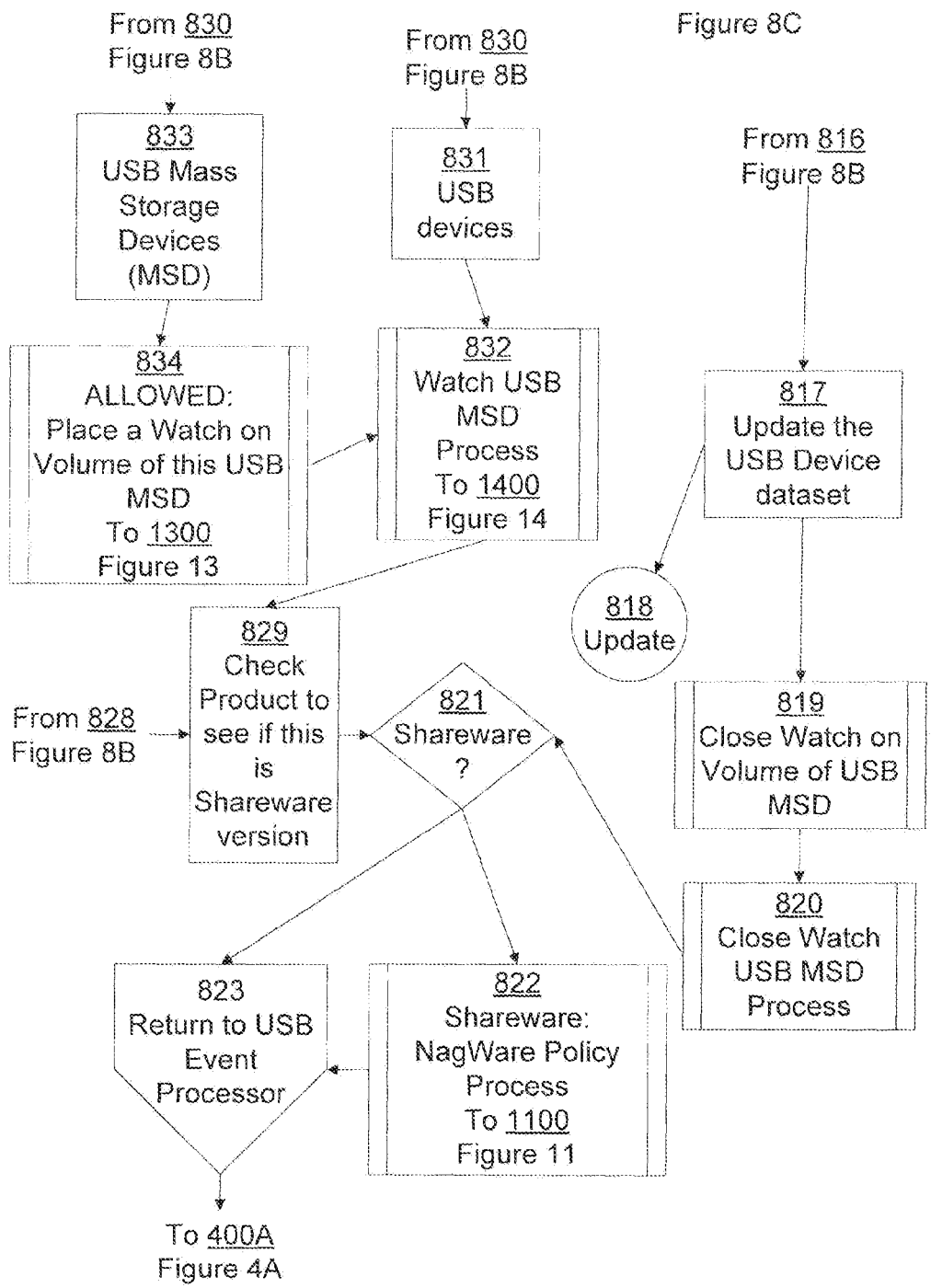

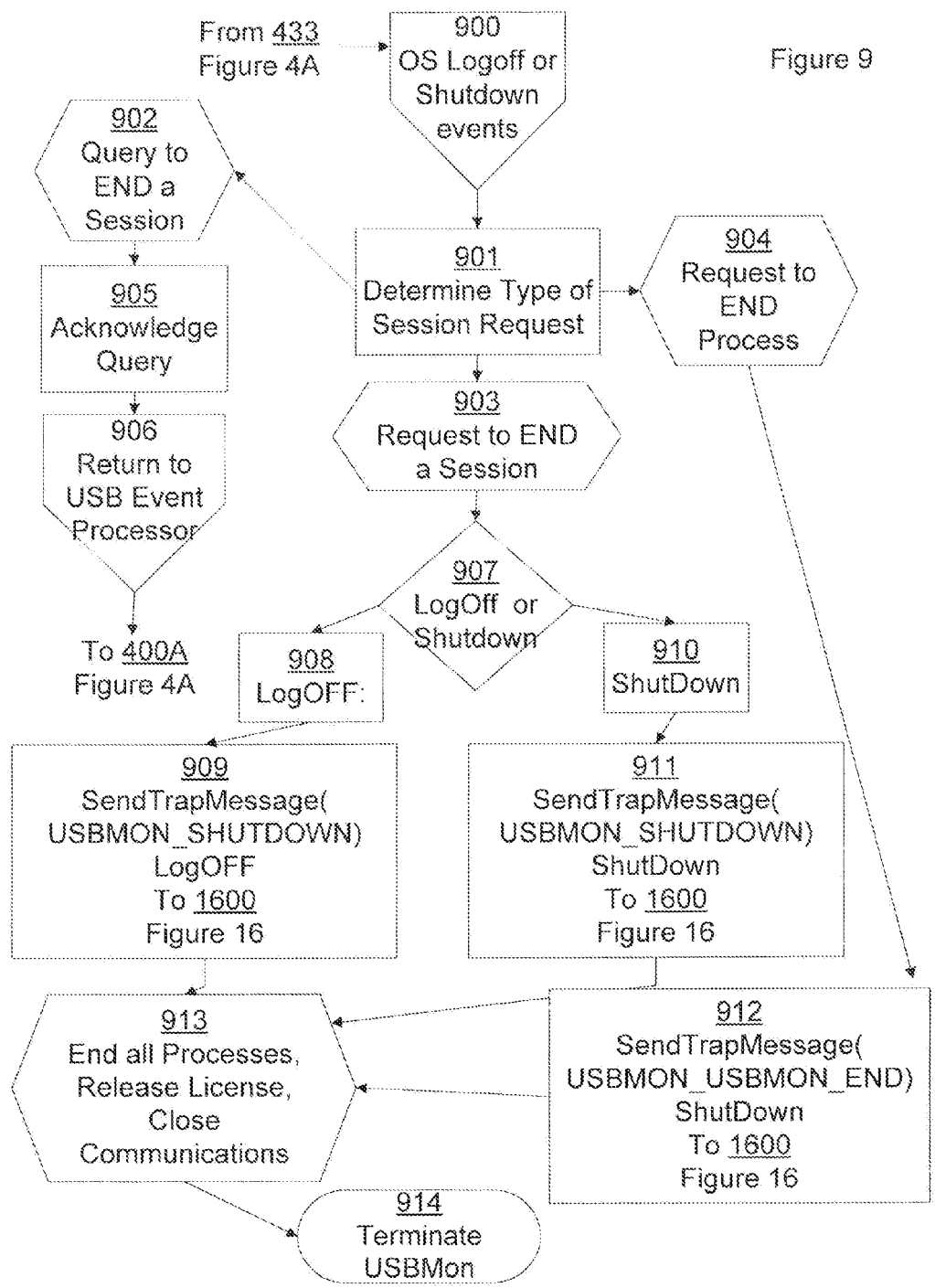

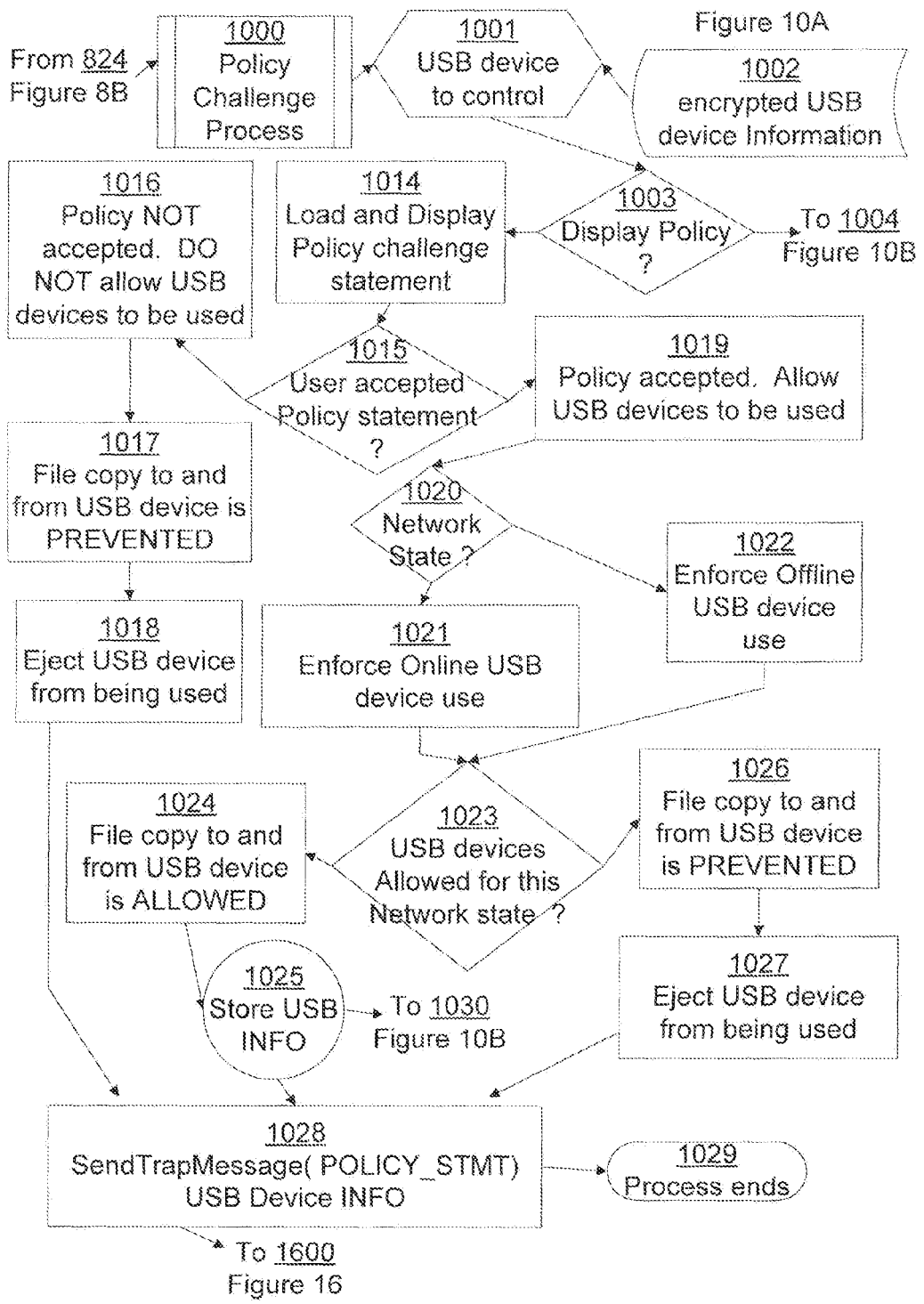

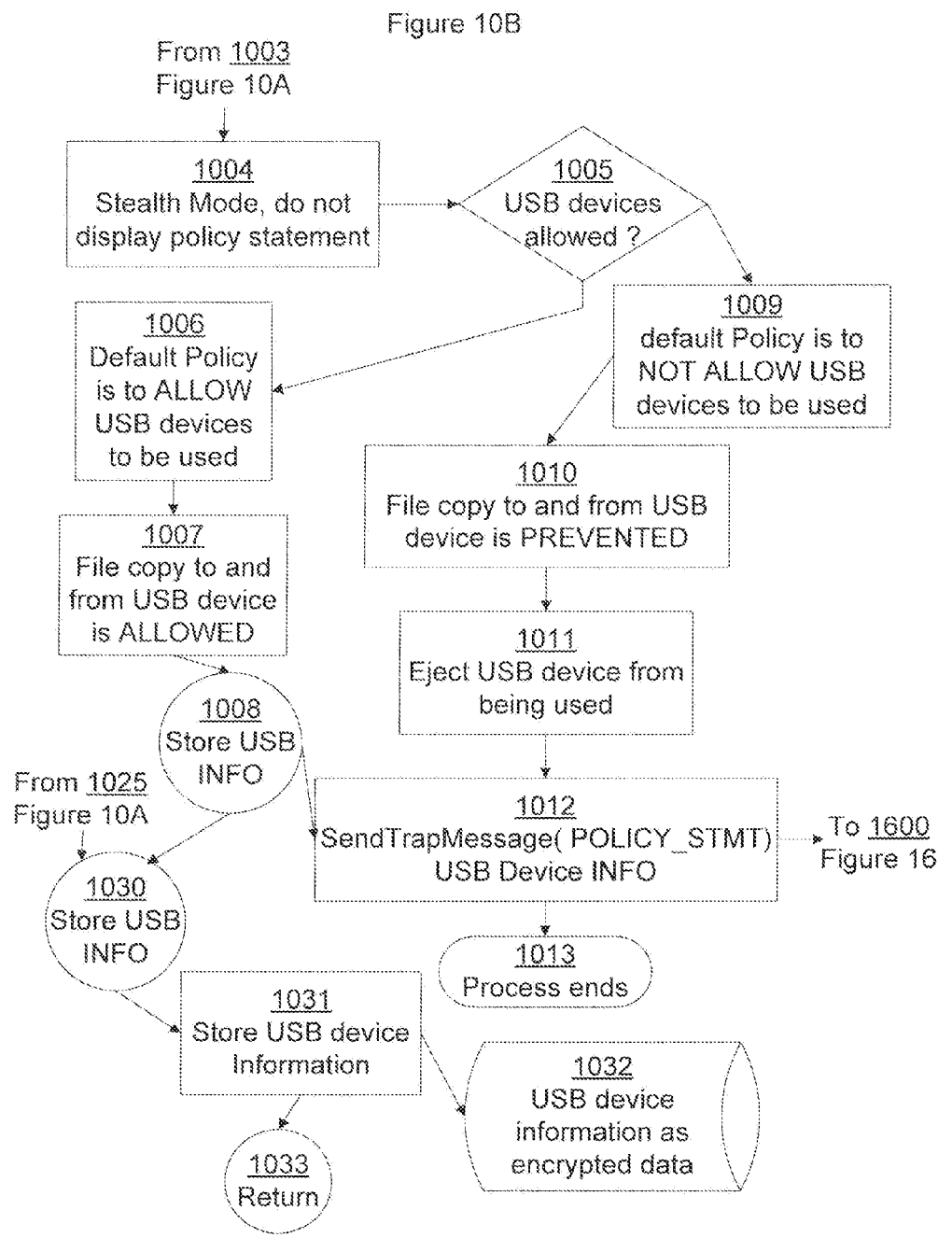

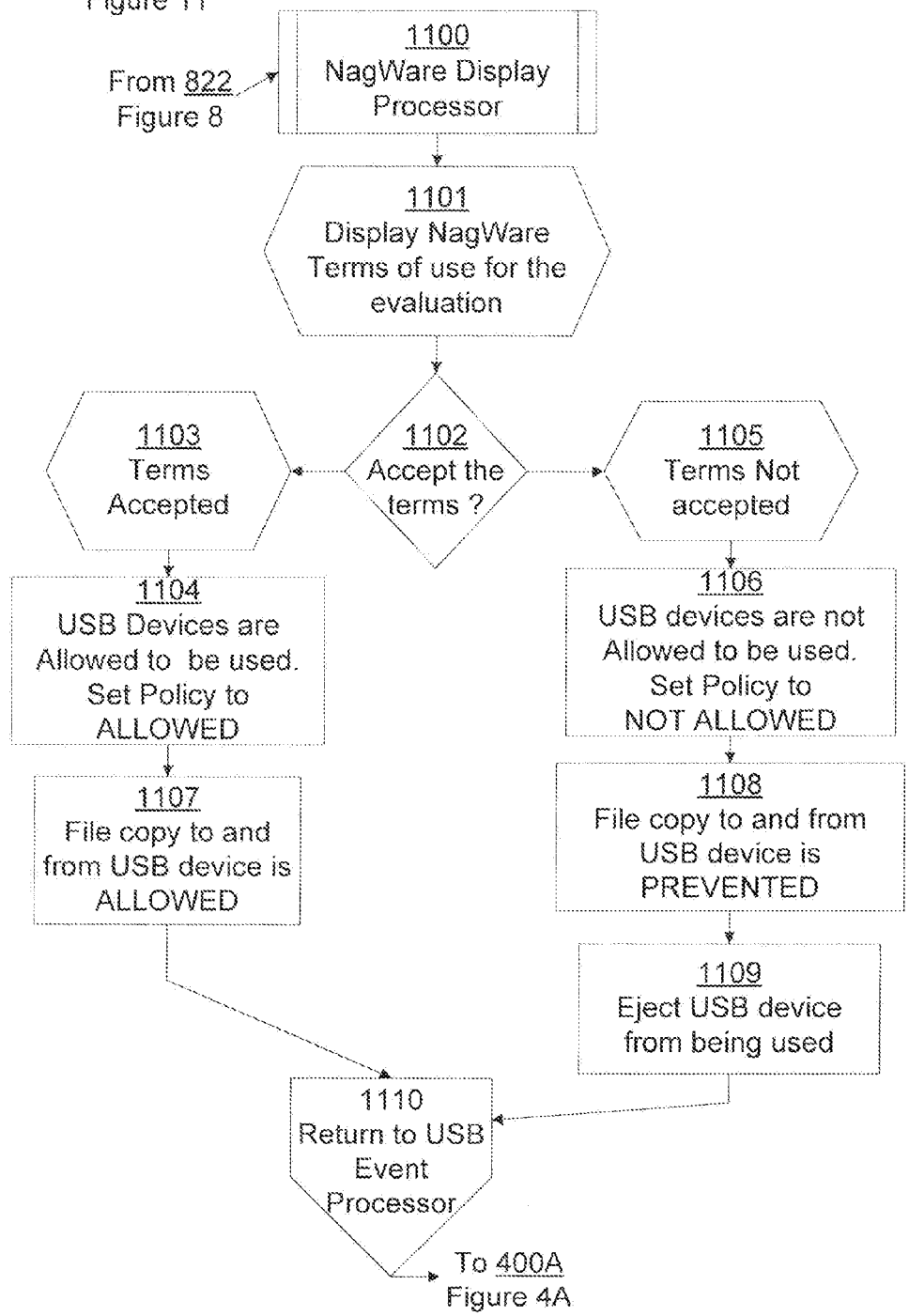

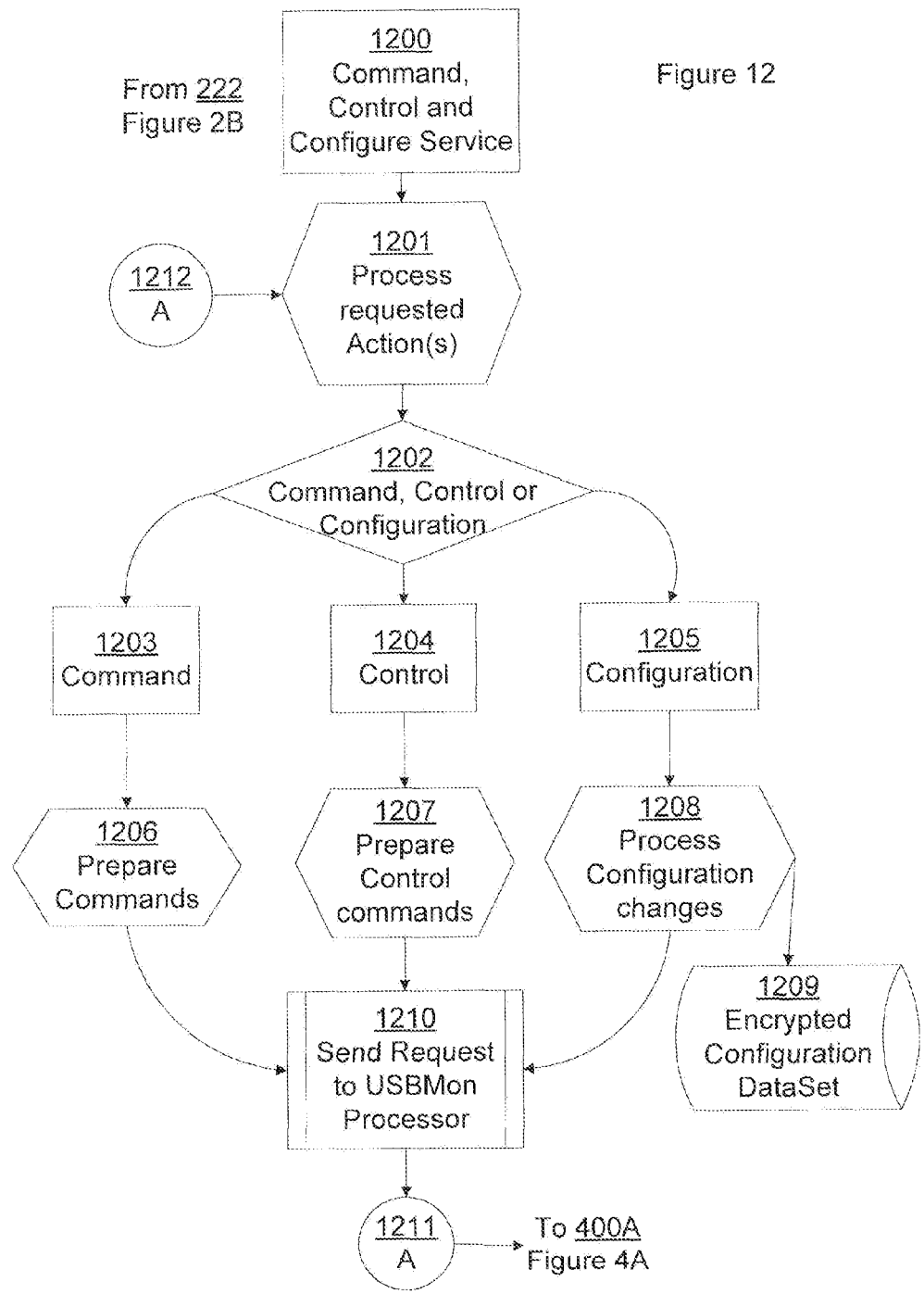

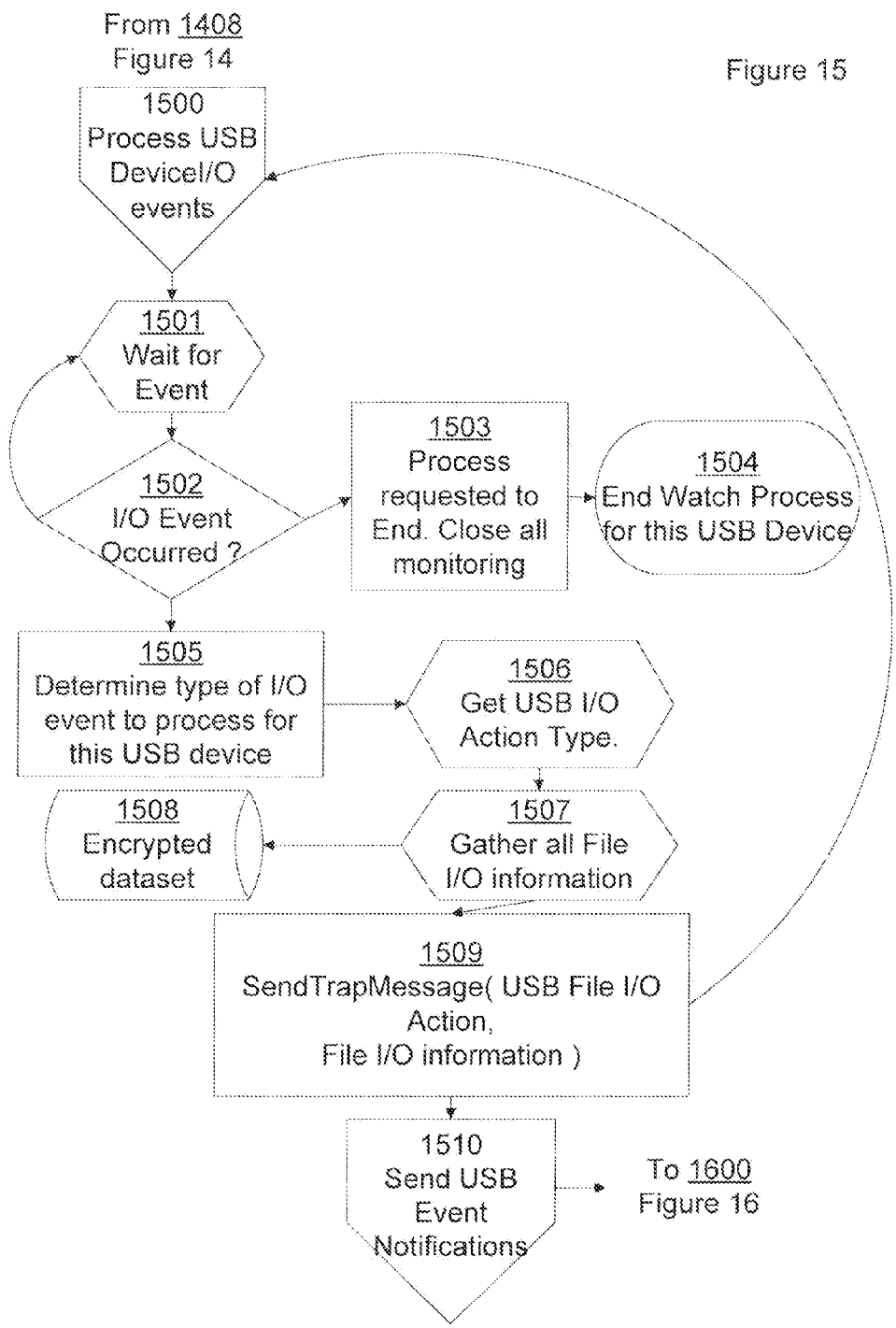

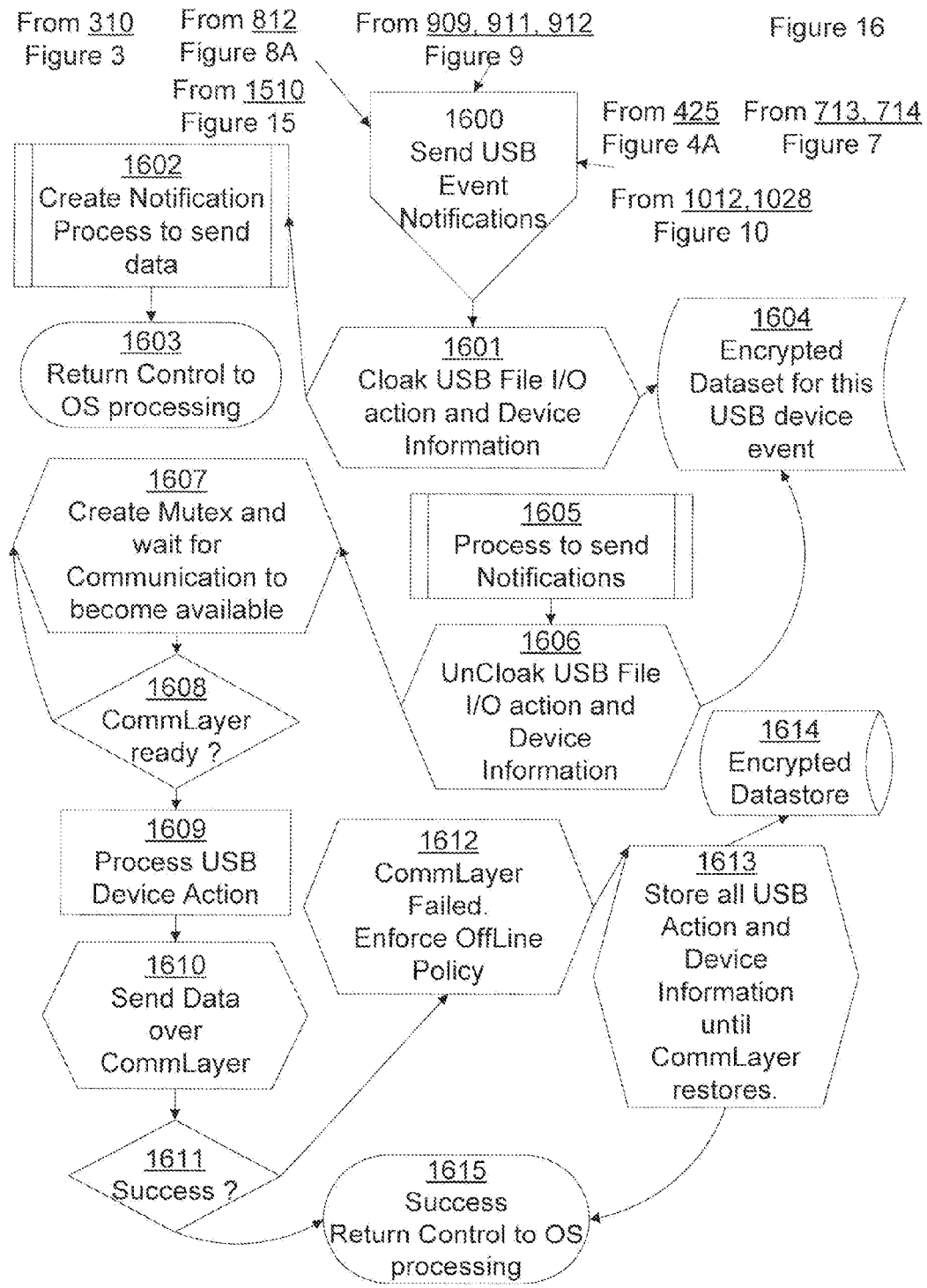

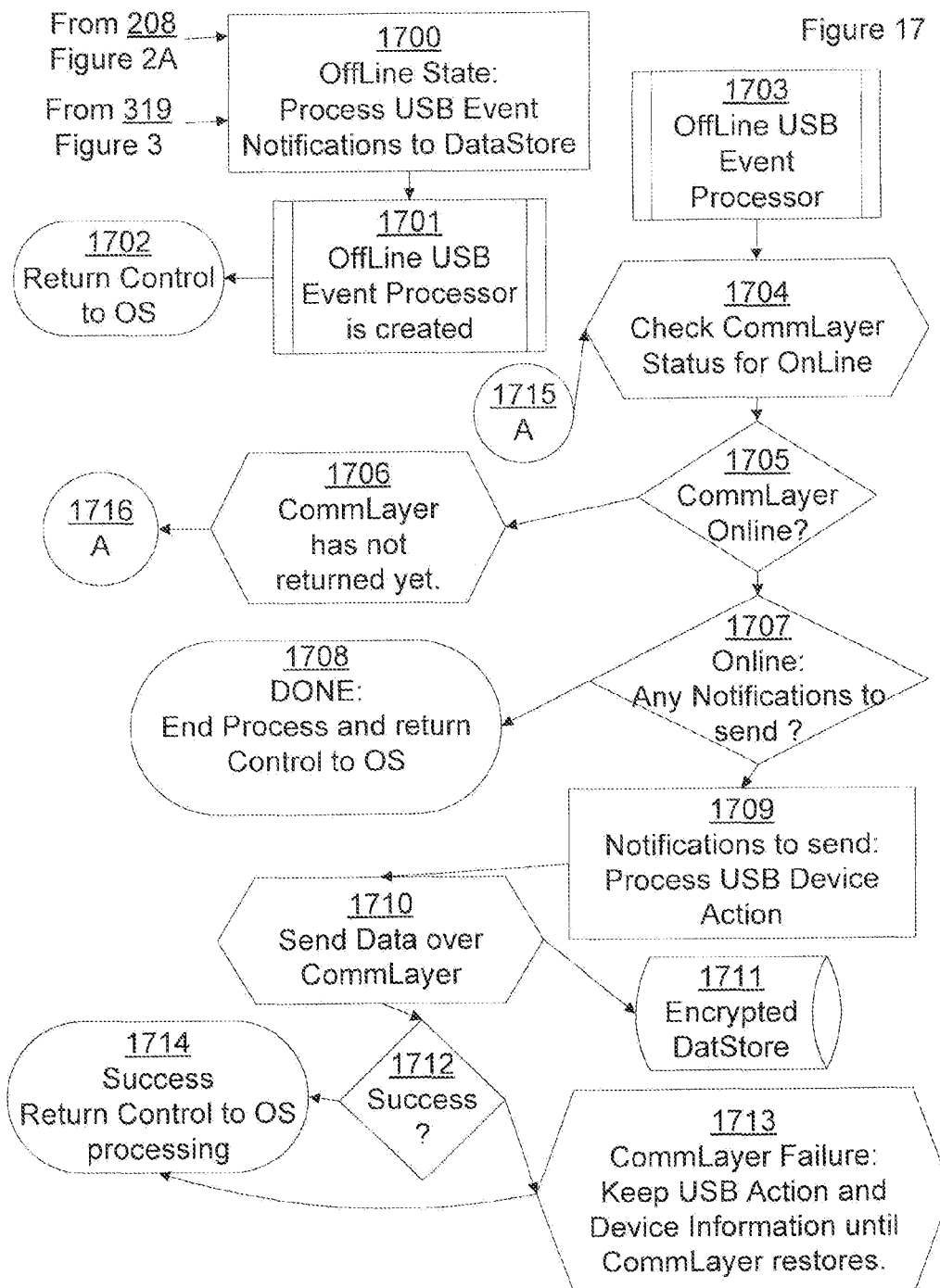

SYSTEM AND APPARATUS FOR CONTROLLING USE OF MASS STORAGE DEVICES

CROSS-REFERENCE TO RELATED APPLICATIONS

A claim of benefit is made to U.S. Provisional Application No. 60/932,860, filed Jun. 1, 2007, the contents of which are incorporated in their entirety herein by reference.

FIELD OF THE DISCLOSURE

The present disclosure relates to USB devices and, more particularly, to controlling their use in a computer.

BACKGROUND OF THE DISCLOSURE

As the popularity of USB devices continues to rapidly grow, so do the concerns about computer intrusion detection and protection from the use of these devices. For the security conscious, a new challenge is presented due to the advanced technological changes brought about by USB devices. The devices are rapidly decreasing in physical size and inversely increasing in storage capacity. The devices are basically undetectable in a person's pocket and their use has become ubiquitous. Computer security solutions have emerged outlining an individual's or an organization's position on the acceptable uses of USB policies. There still does not exist, however, a means for those responsible for the safeguarding of personal or corporate data to know the when, who, where and how of USB device usage.

It is therefore an object of the disclosure to detect the insertion/connection of USB devices.

It is another object of the disclosure to detect the removal/disconnection of USB devices.

It is a further object of the disclosure to provide a policy statement challenge upon the insertion/connection of a USB device, if so configured.

It is a still further object of the disclosure to eject a USB device that does not accept a policy statement challenge, if so configured.

It is a yet another object of the disclosure to eject a USB device if configured to not allow the use of USB devices when connected to a network.

It is another object of the disclosure to eject a USB device if configured to not allow the use of USB devices when not connected to a network.

It is a further object of the disclosure to allow a computer to go into a hibernation state while monitoring USB ports, if so configured.

It is a still further object of the disclosure to not allow a computer to go into a hibernation state while monitoring USB ports, if so configured.

It is another object of the disclosure to provide a policy challenge statement if so configured.

It is a yet further object of the disclosure to allow the use of the USB device if the policy statement is accepted.

It is an additional object of the disclosure to not allow the use of the USB device if the policy is not accepted.

It is a further object of the disclosure to not provide a policy challenge statement if so configured.

It is another object of the disclosure to provide a choice of a standard telecommunication standard to be used as the means of transmitting detected USB events to a local or remote datastore repository for storage, encrypted or unencrypted.

SUMMARY OF THE DISCLOSURE

In accordance with the present disclosure, there is provided a software program, USBMon, that monitors all USB ports of a computer and provides real-time detection of all USB devices connected to a USB port. As a USB device is detected, the device is identified, categorized, catalogued and logged in a secure persistent store, and prompted for a challenge policy of use if so configured. The USB device is prevented from being used if so configured. Transmit information about the detected USB device is sent to a local or remote datastore repository by a selected industry standard telecommunication method configured as a secured or as an unsecured communication protocol.

For purposes of clarity and brevity, like elements and components will bear the same designations and numbering throughout the figures.

BRIEF DESCRIPTION OF THE DRAWINGS

FIG. 1 is a diagrammatic representation of the disclosure according to one embodiment of the disclosure.

FIG. 2A is a first section of a block diagram of a main entry portion of the disclosure according to one embodiment of the disclosure.

FIG. 2B is a second and final section of the block diagram shown in FIG. 2A.

FIG. 4A is a first section of a block diagram of a USB event processor portion of the disclosure according to one embodiment of the disclosure.

FIG. 4B is a second and final section of the block diagram shown in FIG. 4A.

FIG. 5 is a block diagram of a USB Power Management portion of the disclosure according to one embodiment of the disclosure.

FIG. 6 is a block diagram of a USB File IO Control portion of the disclosure according to one embodiment of the disclosure.

FIG. 7 is a block diagram of a USB Media Control portion of the disclosure according to one embodiment of the disclosure.

FIG. 8A is a first section of a lock diagram of a USB Device Event Processor portion of the disclosure according to one embodiment of the disclosure.

FIG. 8B is a second section of the block diagram shown in FIG. 8A.

FIG. 8C is a third and final section of the block diagram shown in FIG. 8A.

FIG. 9 is block diagram of an OS Logoff or Shutdown portion of the disclosure according to one embodiment of the disclosure.

FIG. 10A is a first section of a block diagram of a USB Policy Challenge and Usage portion of the disclosure according to one embodiment of the disclosure.

FIG. 10B is a second and final section of the block diagram shown in FIG. 10A.

FIG. 11 is a block diagram of a NagWare Display Processor portion of the disclosure according to one embodiment of the disclosure.

FIG. 12 is a block diagram of a USBMon Command, Control, Configuration Service portion of the disclosure according to one embodiment of the disclosure.

FIG. 15 is a block diagram of a Process USB Device I/O Events portion of the disclosure according to one embodiment of the disclosure.

FIG. 16 is a block diagram of a Process USB Online Device I/O Events according to one embodiment of the disclosure.

FIG. 17 is a block diagram of a Process USB Offline Device I/O Events according to one embodiment of the disclosure.

FIG. 18A is a first section of a USB Mass Storage Policy Statement according to one embodiment of the disclosure.

FIG. 18B is a second and final section of the USB Mass Storage Policy Statement shown in FIG. 18A.

DETAILED DESCRIPTION OF THE DISCLOSURE

In one aspect of the disclosure as shown in FIG. 1, a computer implemented usb monitoring system or software agent ("usbmon") application process [102] obtains its' configuration and licensing information from their respective programs and datasets [101][103]; communication with local or remote management station[105][106]; communication with a command, control and configuration service[100]; monitoring of USB ports and devices[107][108].

FIG. 2A and 2B show a main entry view of a computer implemented usbmon application process [200] in which the process establishes configuration parameters, real-time logging[201][202][203][204]; determines event notification methods, network connections used[205 . . . 210]; online and offline usb policy and controls[211 . . . 212]; creation of a heartbeat monitoring process [215 . . . 217], registration of this process for all usb generated events [218 . . . 221]; creation of inter-process communication with usbmon service [222]; and creation of main usb event processor[223].

Figure 3:
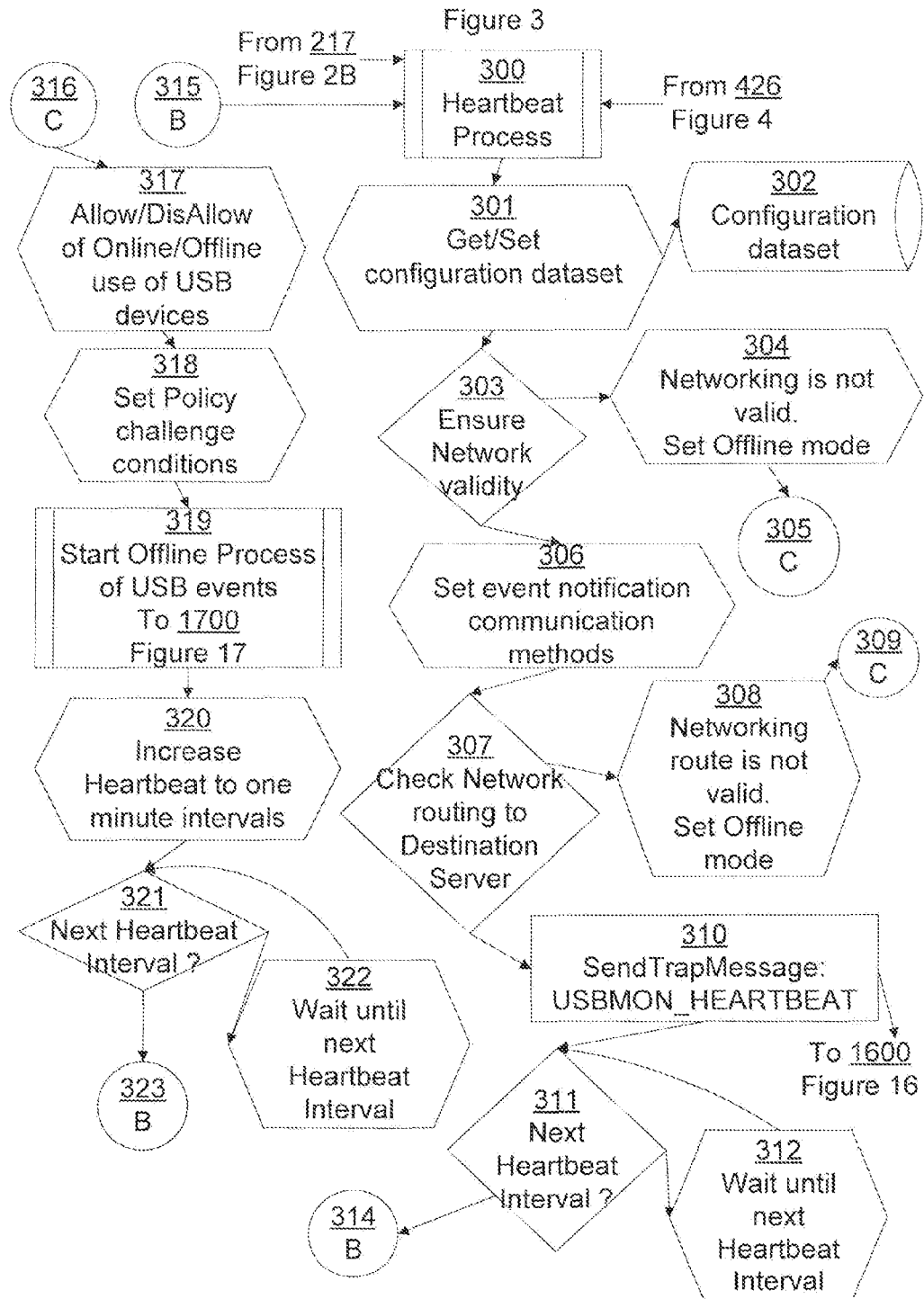
FIG. 3 is a block diagram of a heartbeat process portion of the disclosure according to one embodiment of the disclosure.

FIG. 3 shows a detailed view of a computer implemented heartbeat process [300] that runs at a configured periodic interval, in minutes, [301,302][311,312][315], to check network connections, changes in configuration parameters, changes in event notification methods [303 . . . 310], enforcement of offline and online usb usage policies [316 . . . 319], and the transmission of a heartbeat to a local or a remote network management station indicating that the application is working [310] at periodic intervals[311,312,314,315].

FIGS. 4A and 4B show a detailed view of a computer implemented usb event main processor in which the processor determines the type of usb event received, performs real-time logging, validates proper product licensing, enforces usb device usage policies and transmits usb event notifications to a remote or a local network management server. FIGS. 4A and 4B further show the processing of a startup event[401] [402][409 . . . 427].

FIG. 5 shows a detailed view of a computer implemented usb event processor for power management [500] requests issued by the operating system of the computer in which the power management event type is determined [501][502][503], real-time logging of the information, and if configured, to allow a hibernation state [504] then the request is granted [506] to the operating system to allow hibernation [508]; otherwise the request is denied [507] and the operating will not go into hibernation [508]. A grant or a deny decision is passed on to the control of the operating system [509].

FIG. 6 shows a detailed view of a computer implemented usb events processing for copy & paste, drag & drop, all clipboard processed data [600] in which the data is processed [602[603][604]; real-time logging of the acquired data, enforcement of usb usage policy [605][606] if configured to allow [609,610,611,612], or disallow [607,608,612] writing of this data to a usb mass storage device, then passing on of the data to the operating system for other processing [612]; and then returning control to the operating system [613].

FIG. 7 shows a detailed view of a computer implemented usb processor for handling of all media related events [700] issued by the operating system in which the process determines (7011 the media event type [702.703,704]; drive mapping, assigned operating system full pathname [705,706,707]; real-time logging of the media information to an encrypted datastore [708]; categorization of the media type event [709,710,711]; and storage of the usb event type to an encrypted datastore, followed by the performance of a transmission of a media event notification to a local or a remote network management server containing the media type event with the information describing the usb media [713][714]. Control is then returned back to the operating system [715].

FIGS. 8A, 8B and 8C show a detailed view of a computer implemented usb device event core processor for all usb issued events from the operating system [800]. Each usb event received is given a timestamp [801] and then processed based upon the issued usb event [802]. The issued events detected are usb device inserted [803], usb device remove [804], usb device session ends [805] and usb device end process [806]. As each event is identified, the device associated to this event is assigned a guaranteed unique session identifier [807]. The usb device's information (dataset) is obtained from the usb device and catalogued [808]. The dataset is stored and updated in an encrypted datastore [809], and then logged in a real-time encrypted datastore [810] for logging. The usb device is then checked for the type of usb device [811] and an event notification containing the usb device information, unique session identifier, the network state and the type of the usb event [812] is sent to a local or a remote network management station (as shown in FIG. 16).

The counter [813] for the number of events for this usb device event is incremented and stored with this device's dataset [835]. The device event type is checked for an insert event [814], and if it is not [815], then the event type is a remove, a logoff, a shutdown, or an end. The usb device notifications requests are then unregistered [816] from the operating system. The usb device dataset [817] for this unique session for this device is then updated [818] in the encrypted dataset. The watch process on the volume for this dataset is then closed [819]. The watch process on the device mass storage device [820] is then closed.

If this is a shareware [821] product, the nagware (as shown in FIG. 11) policy [822] is displayed and then returned [823] to the usb event processor (FIGS. 4A and 4B). If the event type is an insert [824] then the challenge policy process (as shown in FIG. 10) is launched. Enforcement of the online or offline usb device usage policy [825] is accomplished by checking the device usage policy [826]. If the usb usage policy is set to not allow the use of usb devices then the system prevents all file input/output operations for this usb device [827], followed by ejecting the usb device from the operating system [828]. A check is then made for a shareware version [829]. If this is a shareware [821] product, the nagware (FIG. 11) policy is displayed [822] and then the system returns [823] to the usb event processor (FIGS. 4A and 4B).

If the usb usage policy is to allow the use of usb devices [826], then a check is performed if the inserted device is a mass storage device (msd) [830]. If it is not an msd [831], then the system monitors the usb device [832]. A check for a shareware version [829] is also made. If this is a shareware

[821] product, the nagware (FIG. 11) policy is displayed [822] and then the system returns [823] to the usb event processor (FIGS. 4A and 4B). If this is an msd [833] and the use of this device is allowed, the system initiates a watch on the volume [834] of this msd, which is created (FIG. 13) and a watch process [832] on the usb msd is created (FIG. 14). A check for a shareware version [829] is also performed. If this is a shareware [821] product, the nagware (FIG. 11) policy [822] is displayed, and then the system returns [823] to the usb event processor (FIGS. 4A and 4B).

FIG. 9 is a detailed view of a computer implemented usb event processor for all requests, queries and commands from the operating system to logoff, shutdown, suspend, and/or hibernate [900] the usbmon process or the computer. The type of power management request is determined [901]. A query to end the process [902] is acknowledged [905] and control is returned back to the operating system. A request to end the usbmon process [904] results in an event notification being sent to a local or a remote network management [912], all processes are ended, licenses are released and communications are closed [913], and the usbmon process ends [914]. If a request to end a usbmon session [903] is received, the request is then determined [907] for either a logoff request [908] or a shutdown request[910].

A logoff event request results in an event notification being sent to a local or a remote network management [909] indicating that the user has logged off, all processes are ended, licenses are released and communications are closed [913], and the usbmon process ends [914]. A shutdown event request results in an event notification being sent to a local or a remote network management [911] indicating that the computer is shutting down, all processes are ended, licenses are released and communications are closed [913], and the usbmon process ends [914].

FIGS. 10A and 10B show a detailed view of a computer implemented policy challenge processor in which usb device insertions detected by the operating system result in the popup display of a policy challenge statement (such as the illustrative example in FIGS. 18A and 18B) that can either be accepted or not accepted. This policy statement is a configurable text file that may be modified to reflect the usage of usb devices inserted into the computer in either an online or an offline network state. The usage of usb devices may be allowed or not allowed in either an online or an offline network state. The display of the policy challenge text may be displayed or not displayed in a popup window if the process has been so configured as to not display the policy [stealth mode].

The desired usb usage policy is enforced by the usb event processor (FIGS. 8A, 8B and 8C) as the usb device event is processed. This policy challenge process is created and launched[1000] by the usb event processor (FIGS. 8A, 8B and 8C), and all data provided by the usb device is gathered [1001] and stored in an encrypted datastore [1002]. The condition to display the policy is checked [1003], and if the configuration is set to not display the policy statement [1004], then the policy statement is not displayed. If the configuration is set to display the policy statement [1014], then the policy statement is displayed in a popup window and the user must answer yes or no to this challenge policy. If the policy is not to be displayed [1004], then the configuration policy for the usage of usb devices is checked [1005] to determine the allowed usage of usb devices [1006][1009].

If the policy is to not allow the use of usb devices [1009], then the operating system file input/output operations to and from the usb device is prevented [1010]. The usb device is then ejected from the operating system [1011]. A usb event notification is then sent to the usb event processor (FIG. 16) with the policy statement as being rejected and all the information describing the usb device inserted [1012]. The policy challenge process ends and returns to the operating system [1013]. If the policy is to allow the use of usb devices [1006], then the operating system file input/output operations to and from the usb device are allowed [1007].

The information describing the usb device is stored [1008]. A usb event notification is then sent to the usb event processor (FIG. 16) with the policy statement as being accepted and all the information describing the usb device inserted [1012]. The policy challenge process ends and returns to the operating system [1013]. If the configured condition is checked to display the challenge policy [1014], then the policy statement text file is displayed in a popup window and the user must answer yes or no to this policy challenge[1015]. If the user answers no to this challenge, then the policy is not accepted and the use of usb devices is not allowed [1016], file input/output operations to and from the usb device are prevented [1017], the usb device is then ejected from the operating system [1018]. A usb event notification is then sent to the usb event processor (FIG. 16) with the policy statement as being rejected and all the information describing the usb device inserted [1028]. The policy challenge process ends and returns to the operating system [1029].

If the user answered yes to the policy challenge display [1015], then the policy challenge is accepted and the use of the usb device is allowed[1019]. The communication layer is then checked for availability and network found condition to determine an online network or offline network [1020] state. If the network state is found to be online [1021] or offline [1022], then the usb usage policy configured for these states is enforced by checking this state [1023]. If the configured usb usage policy is to not allow the use of usb devices when offline, then the use of usb devices is not allowed, file input/output operations to and from the usb device are prevented [1026], and the usb device is then ejected from the operating system [1027]. A usb event notification is then sent to the usb event processor (FIG. 16) with the policy statement as being rejected and all the information describing the usb device inserted [1028]. The policy challenge process ends and returns to the operating system [1029].

If the policy is to allow the use of usb devices [1023] when online then the operating system file input/output operations to and from the usb device are allowed [1024]. The information describing the usb device is stored [1025]. A usb event notification is then sent to the usb event processor (FIG. 16) with the policy statement as being accepted and all the information describing the usb device inserted [1028]. The policy challenge process ends and returns to the operating system [1029].

FIG. 11 shows a detailed view of a computer implemented nagware process [1100] for the shareware version of the usbmon product in which the process is launched upon every usb device insertion or removal which subsequently pops up a policy statement [1101] indicating that this is a shareware version which may be upgraded to a registered version which will then allow full functionality. If the provided policy statement terms [1102] are not accepted [1105], then the usage of usb devices are not allowed [1106], file input/output operations are not allowed [1108], the usb device inserted is then ejected from the operating system [1109], and control is returned to the operating system[1110]. If the provided policy statement terms [1102] are accepted [1103], then the usage of usb devices are allowed [1104], file input/output operations are allowed [1107], and control is returned to the operating system[1110].

FIG. 12 shows a detailed view of a computer implemented usb command, control and configuration service [1200] that allows the usbmon process to be controlled from an intranet or an internet network management station over a secured and encrypted network communication connection between this service and the usbmon process. This service receives a requested action [1201], which is then determined to the type or requested action as a command request [1203], a control request [1204] or a configuration request [1205]. A command request [1203] is prepared [1206] and sent [1210] to the usbmon processor (FIGS. 4A and 4B) and this service then waits for any other requests [1211]. A control request [1204] is prepared [1207] and sent [1210] to the usbmon processor (FIGS. 4A and 4B) and this service then waits for any other requests [1211]. A configuration request [1205] is prepared and processed for any changes to the currently stored configuration dataset [1208] with any changes being updated and stored in the encrypted configuration dataset [1209]. This request is then sent [1210] to the usbmon processor (FIGS. 4A and 4B) and this service then waits for any other requests [1211].

Figure 13:
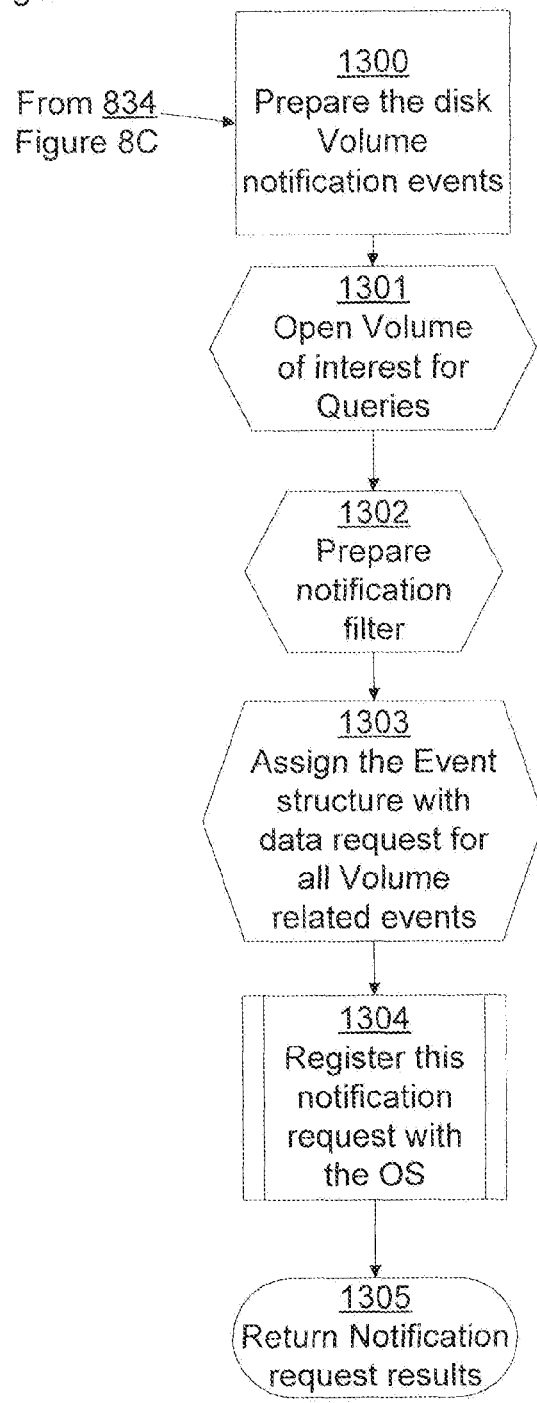
FIG. 13 is a block diagram of a USB MSD Volume Watch portion of the disclosure according to one embodiment of the disclosure.
Figure 14:
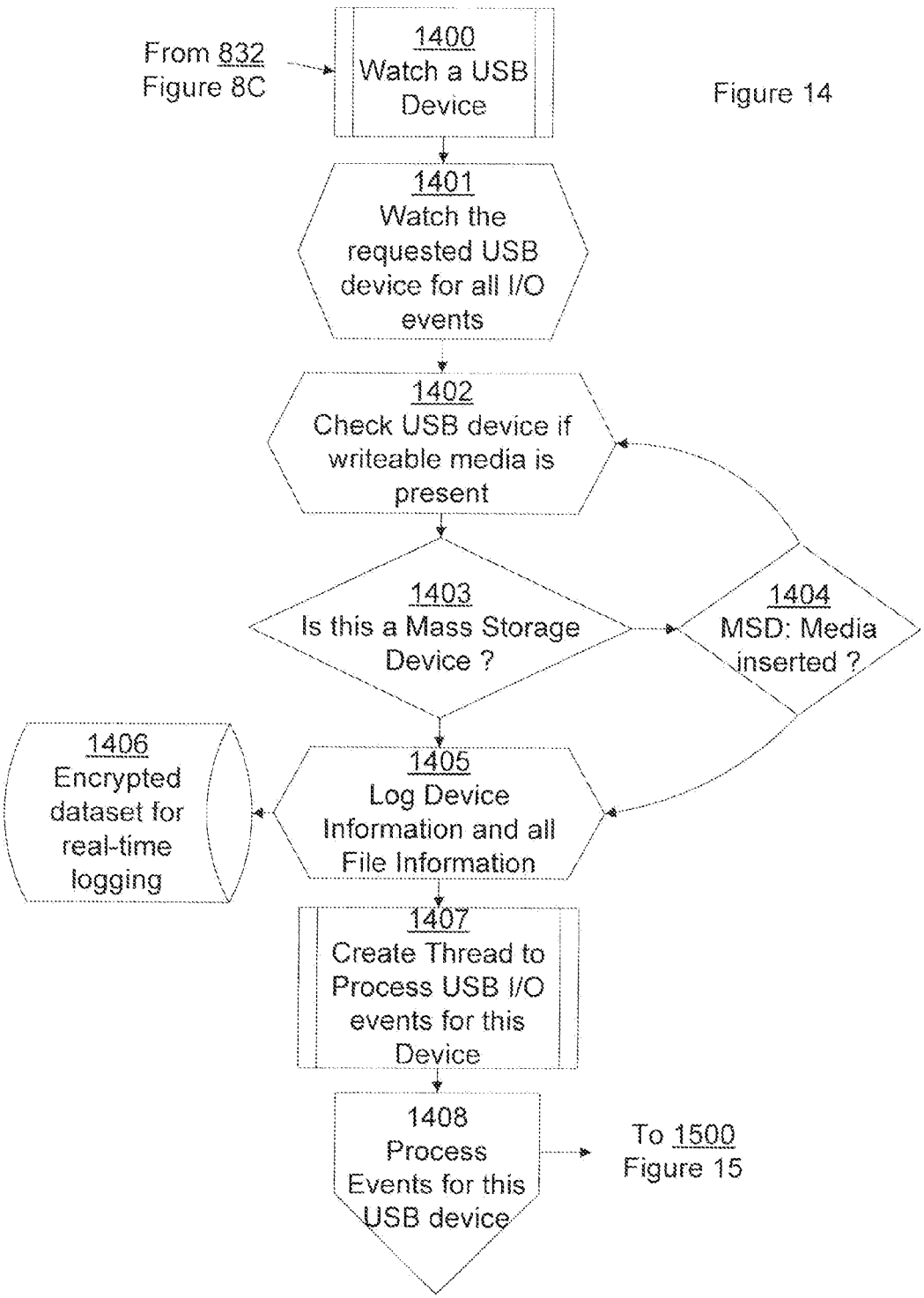
FIG. 14 is a block diagram of a USB Watch Directory portion of the disclosure according to one embodiment of the disclosure.

FIG. 13 shows a detailed view of a computer implemented usb volume processor [1300] that watches all file input/output operations [1301] on a usb mass storage device that has been inserted into the computer, identified as a disk subsystem volume [1302] with an associated drive letter mapping [1303] and is being monitored by the usbmon processor [1304]. Results of processing this notification request is returned to the calling process [1305].

FIG. 14 shows a detailed view of a computer implemented usb watch directory processor [1400] that watches all file input/output on a usb mass storage device that has been inserted into the computer [1401], identified as a disk subsystem directory with an associated drive letter mapping and is being monitored by the usbmon processor. Processor [1400] checks the device type as a mass storage device [1402]. If media is not inserted in the device [1403] then the system waits for media to be inserted, or otherwise logs the usb device information [1405] to an encrypted real-time logging datastore [1406], creates and launches the process to monitor and controls usb input/output usb events [1407] then passes control to the usb events processor (FIGS. 4A and 4B).

FIG. 15 shows a detailed view of a computer implemented processor for all usb device input/output events [1500] in which the process waits for an operating system usb event [1501] that is received [1502], and processed to determine the type of input/output event [1505]. The processor gathers [1506] and stores all file information related to the event [1507], stores the data in an encrypted data store [1508], then sends a usb event notification [1509] that contains the gathered file information and the file action type to a local or a remote network management station [1510] and then is processed by the usb event processor (FIGS. 4A and 4B). If the process is requested to end [1503] then the watch process monitoring this usb device is ended [1504].

FIG. 16 shows a detailed view of a computer implemented process for usb online device i/o event notification [1600] message sent to a local or a remote network management station over secured or unsecured network, as configured by the usbmon configuration dataset. The received usb event notification is encrypted [1601] and stored in an encrypted dataset storage [1604], a send notification process is created and launched [1602] and then control is returned to the operating system [1603]. When the send notification process begins [1605], the usb event notification message is retrieved, processed by file input/output action and usb device information [1606], using the configured communication protocol configured for event transmission[1607], the communication protocol is checked for availability and a ready to send connection[1608]. If this communication protocol is not available to send then the process waits until readiness is confirmed. Once readiness is confirmed the dataset is processed [1609] by file input/output action type and the dataset is sent over the configured network communication configured [1610].

If the transmission is successful [1611], then control is relinquished to the operating system [1615]. If the transmission has failed [1612] then the process enforces the usb offline policy, the usb dataset for this event message [1613] is stored in an encrypted datastore [1614] for processing by the usb offline device events processor. Control is relinquished to the operating system [1615].

FIG. 17 is a detailed view of a computer implemented process for usb offline device i/o event processing [1700]. Starting this process creates a background process [1701] for real-time processing of event transmission once an online network connection is found [1703]. When the configured network connection [1704] is available and ready [1705], this process begins to transmit the stored usb event notifications [1707]. The data is retrieved from an encrypted datastore [1711], processed by file input/output action type and usb device information [1709], then sent [1710] to a local or a remote network management station as configured by the usbmon configuration dataset. If the communication protocol should fail [1712] during this process, the dataset is not removed [1713] from the datastore and the process reverts from an online mode back to the offline mode and offline policy enforcement of usb devices is enacted. If the event notification sent over this communication protocol is successful [1712], the dataset is deleted from the datastore and processing continues until all data contained within the encrypted datastore has been sent successfully [1714]. This process then relinquishes control back to the operating system.

Since other modifications and changes varied to fit particular operating requirements and environments will be apparent to those skilled in the art, the disclosure is not considered limited to the examples chosen for purposes of disclosure, and covers all changes and modifications which do not constitute departures from the true spirit and scope of this disclosure.

Having thus described the disclosure, what is desired to be secure by United States Letters Patent is:

1. A method of monitoring the use of mass storage devices connected to a computer Universal Serial Bus (USB) port comprising the steps of:
   detecting the presence of a mass storage device connected to a computer USB port;
   creating a unique session identifier;
   displaying a mass storage device policy statement on a monitor of the computer setting forth mass storage device user conditions;
   prompting a computer user to respond to the policy statement by accepting or declining the statement; and controlling the mass storage devices access to the computer's operating system by permitting access if the user accepts the policy statement or preventing access if the user declines the policy statement,
   wherein the unique session identifier comprises a combination of the mass storage device type, mass storage device serial number, date and time of mass storage device computer access attempt and the computer operating system assigned drive letter designation for the computer port to which the mass storage device is attached.

2. The method of claim 1 further comprising:
identifying a serial number of a detected mass storage device.

3. The method of claim 2 further comprises storing the serial number in a database.

4. The method of claim 3 wherein the database is a remote database to which the serial number information is transmitted.

5. The method of claim 2 wherein the database is encrypted.

6. The method of claim 1 further comprising the steps of:
providing a USB monitoring software agent in the computer for tracking files read from, or written to, the mass storage device;
allowing the mass storage device to read and/or write files located in the computer after the policy statement is accepted by the computer user; and
tracking files read from, or written to, the mass storage device.

7. The method of claim 6 further comprising the step of storing file information about files read from, or written to, the mass storage device in a database.

8. The method of claim 7 wherein the database is a remote database to which the file information is transmitted.

9. The method of claim 8 wherein the file information is transmitted by a secure or un-secure network communication link.

10. The method of claim 7 wherein the database is encrypted.

11. The method of claim 1 further comprising the step of preventing the mass storage device from being used by the computer operating system when the computer user declines the policy statement.

12. The method of claim 11 further comprising the step of removing the mass storage device from the operating system's known hardware devices to disable use of the mass storage device with the computer.

13. The method of claim 1 wherein the unique session identifier further comprises a designation for the type of access event.

14. The method of claim 1 further comprising creating a log event wherein the unique session identifier is recorded in the log event.

* * * * *